(12) United States Patent
Adiba et al.

(10) Patent No.: US 11,605,377 B2
(45) Date of Patent: Mar. 14, 2023

(54) DIALOG DEVICE, DIALOG METHOD, AND DIALOG COMPUTER PROGRAM

(71) Applicant: HITACHI, LTD., Tokyo (JP)

(72) Inventors: Amalia Istiqlali Adiba, Tokyo (JP); Takeshi Homma, Tokyo (JP); Takashi Sumiyoshi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 177 days.

(21) Appl. No.: 16/824,634

(22) Filed: Mar. 19, 2020

(65) Prior Publication Data

US 2020/0365146 A1 Nov. 19, 2020

(30) Foreign Application Priority Data

May 13, 2019 (JP) .............................. JP2019-090423

(51) Int. Cl.
*G10L 15/22* (2006.01)
*G10L 15/197* (2013.01)
(Continued)

(52) U.S. Cl.
CPC ............ *G10L 15/197* (2013.01); *G10L 15/02* (2013.01); *G10L 15/05* (2013.01); *G10L 15/187* (2013.01);
(Continued)

(58) Field of Classification Search
CPC ..... G10L 15/063; G10L 15/183; G10L 15/16; G10L 15/02; G10L 15/14; G10L 15/197; G10L 2015/0635; G10L 25/18; G10L 25/21; G10L 25/87; G10L 15/065; G10L 15/22; G10L 15/28; G10L 15/05; G10L 15/18; G10L 15/1807; G10L 15/187;
(Continued)

(56) References Cited

U.S. PATENT DOCUMENTS 9,437,186 B1 9/2016 Liu et al.
10,134,425 B1 * 11/2018 Johnson, Jr. ............ G10L 15/05
(Continued)

FOREIGN PATENT DOCUMENTS

JP 2008241890 A 10/2008
JP 2015-135420 A 7/2015

OTHER PUBLICATIONS

Extended European Search Report dated Aug. 24, 2020 for European Patent Application No. 20164080.2.
(Continued)

*Primary Examiner* — Vijay B Chawan
(74) *Attorney, Agent, or Firm* — Volpe Koenig

(57) ABSTRACT

The dialog device according to the present invention includes a prediction unit 254 configured to predict an utterance length attribute of a user utterance in response to a the machine utterance, a selection unit 256 configured to use the utterance length attribute to select, as a feature model for usage in an end determination of the user utterance, at least one of an acoustic feature model or a lexical feature model, and an estimation unit 258 configured to estimate an end point in the user utterance using the selected model. By using this dialog device, it is possible to shorten the waiting time until a response is output to a user utterance by a machine, and to realize a more natural conversation between a user and a machine.

10 Claims, 11 Drawing Sheets

(51) Int. Cl.
- *G10L 15/02* (2006.01)
- *G10L 15/05* (2013.01)
- *G10L 15/187* (2013.01)

(52) U.S. Cl.
CPC ........ *G10L 15/22* (2013.01); *G10L 2015/025* (2013.01); *G10L 2015/223* (2013.01)

(58) Field of Classification Search
CPC ........ G10L 2015/025; G10L 2015/223; G06N 3/0445; G06N 3/084; G06N 3/08; G06N 3/04; G06N 3/0454; G06N 2/0472; G06F 40/216; G06F 40/284; G06F 40/35
USPC ................ 704/207, 240, 243, 251, 253, 254
See application file for complete search history.

(56) References Cited

U.S. PATENT DOCUMENTS

| | | | |
|---|---|---|---|
| 10,235,994 B2* | 3/2019 | Huang | G06N 3/08 |
| 10,319,374 B2* | 6/2019 | Catanzaro | G10L 15/063 |
| 10,332,509 B2* | 6/2019 | Catanzaro | G10L 25/21 |
| 2002/0147581 A1* | 10/2002 | Shriberg | G10L 25/87 |
| | | | 704/207 |
| 2009/0119102 A1* | 5/2009 | Bangalore | G10L 15/1807 |
| | | | 704/240 |
| 2012/0271635 A1* | 10/2012 | Ljolje | G10L 15/187 |
| | | | 704/254 |
| 2015/0206531 A1* | 7/2015 | Fujisawa | G10L 15/22 |
| | | | 704/251 |
| 2016/0379632 A1* | 12/2016 | Hoffmeister | G10L 15/18 |
| | | | 704/253 |
| 2017/0148431 A1* | 5/2017 | Catanzaro | G10L 25/18 |
| 2017/0148433 A1* | 5/2017 | Catanzaro | G06N 3/084 |
| 2017/0256254 A1* | 9/2017 | Huang | G10L 15/02 |
| 2018/0052913 A1* | 2/2018 | Gaskill | G06N 5/02 |
| 2019/0147853 A1* | 5/2019 | Gunasekara | G06N 3/08 |
| | | | 704/243 |
| 2020/0043468 A1* | 2/2020 | Willett | G06N 5/003 |

OTHER PUBLICATIONS

Raux, "Flexible Turn-Taking for Spoken Dialog Systems", Thesis, School of Computer Science, Carnegie Mellon University, (Dec. 2008).

* cited by examiner

DIALOG DEVICE, DIALOG METHOD, AND DIALOG COMPUTER PROGRAM

CROSS-REFERENCE TO RELATED APPLICATIONS

The present application claims priority to Japanese Patent Application No. 2019-090423, filed May 13, 2019. The contents of this application are incorporated herein by reference in their entirety.

TECHNICAL FIELD

The present invention relates to a dialog device, a dialog method, and a dialog computer program.

BACKGROUND OF THE INVENTION

In dialog devices that utilize computers, in order to realize a natural conversation between a user and the dialog device, it is important to reduce the waiting time until a response from the dialog device is output. Techniques have been proposed in the prior art to reduce this waiting time and facilitate the dialog between users and dialog devices.

For example, Japanese Unexamined Patent Application Publication No. 2008-241890 (Patent Document 1) describes a technique in which "First, a word string is extracted from an input voice (S30). In addition, a speech speed of the input voice is calculated (S40). Next, an appearance probability list that stores a word string predicted to follow a current input word string (hereinafter referred to as a subsequent prediction word string) and an appearance probability that corresponds to the subsequent prediction word string is compared with the extracted word string to extract the subsequent prediction word string that has the highest appearance probability among the subsequent prediction word strings predicted to follow the extracted word string (S50). Further, using the calculated speech speed, the time required for the subsequent prediction word string to be input (hereinafter, referred to as a "subsequent input time") is calculated (S60). Subsequently, the appearance probability of the extracted subsequent prediction word string is used as a confidence level and assigned to the extracted subsequent prediction word string (S70). Thereafter, in a case that the confidence level is greater than or equal to a response determination value, the output timing prediction is determined with this subsequent input time (S80)."

In addition, Japanese Unexamined Patent Application Publication No. 2015-135420 (Patent Document 2) describes a technique in which "a voice recognition terminal device acquires a voice command uttered by a user (S10), transmits the acquired voice command to a voice recognition server and requests voice recognition processing (S12). At this time, the voice recognition terminal device predicts a response delay time until a response message will be received from the voice recognition server, determines the content of "tether words" for filling the predicted response delay time, and utters the determined tether words until a response message is received (S14). Next, when a response message is received from the voice recognition server, the voice recognition terminal device executes an output process based on the acquired response message (S16)."

CITATION LIST

Patent Literature

[Patent Document 1] Japanese Unexamined Patent Application Publication No. 2008-241890

[Patent Document 2] Japanese Unexamined Patent Application Publication No. 2015-135420

SUMMARY OF INVENTION

Technical Problem

The above-mentioned Patent Document 1 describes that an appropriate timing for outputting a machine response is calculated using a successive prediction word string predicted to follow an extracted word string and a speech speed of a user. Further, the above-mentioned Patent Document 2 describes outputting "tether words" corresponding to an estimated waiting time in order to fill the waiting time of generating a machine utterance in response to a user utterance. However, none of the above-mentioned patent documents consider selecting a machine learning model for generating an appropriate response (machine utterance) based on a predicted utterance length attribute (information indicating whether the utterance is long or short) for the next utterance of the user.

It is therefore an object of the present invention to provide a technique for reducing the waiting time of the user by selecting, from either an acoustic feature model or a lexical feature model, a model for determining the end point of a user utterance based on a prediction of a length attribute of a user utterance.

Solution to Problem

In order to solve the above-mentioned problems, one representative dialog device according to the present invention includes a prediction unit configured to predict an utterance length attribute of a user utterance, a selection unit configured to select, as a feature model for usage in an end determination of the user utterance, at least one of an acoustic feature model or a lexical feature model using the utterance length attribute, and an estimation unit configured to estimate an end point of the user utterance using the feature model selected by the selection unit.

According to the present invention, it is possible to provide a technique for reducing the waiting time of the user by selecting, from either an acoustic feature model or a lexical feature model, a model for determining an end point of a user utterance based on a prediction of a length attribute of a user utterance.

Other problems, configurations, and effects than those described above will be become apparent from the following description of embodiments.

DESCRIPTION OF EMBODIMENT(S)

Figure 1:
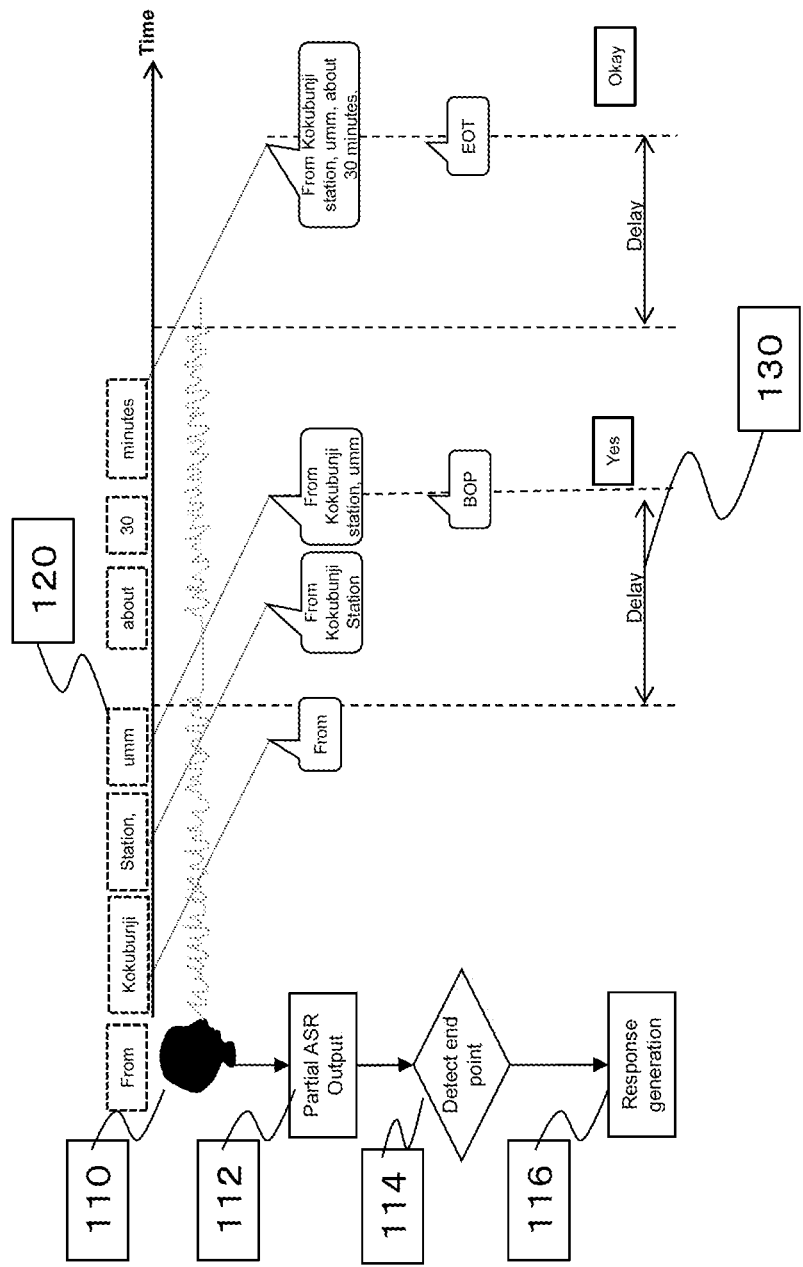
FIG. 1 is a diagram illustrating an example of a problem resulting from waiting time in an automatic speech recognition process.

Hereinafter, the embodiments of the present invention will be described with reference to the drawings. It should be noted that the present invention is not limited to these embodiments. In the description of the drawings, the same portions are denoted by the same reference numerals.

(Hardware Configuration)

First, an outline of the present invention will be described with reference to FIG. 1.

In conventional dialog systems, there can be waiting time from the time when a user speaks an utterance until a response to this utterance is output from the dialog system. One reason for this is that the dialog system takes time to determine whether the user utterance has completely ended, or whether the user is temporarily pausing during the utterance.

When such a waiting time occurs, users may not know whether or not the speech they uttered has been properly accepted by the dialog system, and may feel anxiety or utter the speech again.

Accordingly, in order to realize a natural conversation between users and dialog systems, it is desirable to reduce the waiting time of the user in the dialog system.

In order to shorten the waiting time of users, End of Turn (EoT) detection models and Backchannel Opportunity Prediction (BOP) detection models configured to detecting the end points in a user utterance are known. EOT detection models are models in which the dialog system determines whether to continue input of a user utterance or to stop input of an utterance and generate a response.

In addition, BOP models are models for determining whether or not the dialog system should output a backchannel such as "I'm listening," "Please continue speaking" or the like to the human in order to clarify the intention. Hereinafter, EOT may be referred to as "utterance termination" and BOP may be referred to as "backchannel opportunity".

It should be noted that, since both BOT and EOT are temporary end points of the user utterance from the perspective of the dialog device, they may be collectively referred to as "end points."

Broadly speaking, EOT detection models and BOP detection models make use of acoustic feature models for estimating end points using acoustic features (for example, mel frequency cepstrum coefficients, pitch, or the like) of user utterances, and lexical feature models for estimating end points using lexical features (words, phonemes, morphemes, and other elements that constitute words) output from an automatic speech recognition technique that inputs the user utterance.

In general, end determination using lexical features is more accurate than end determination using acoustic features, and the probability that the end points (BOP and EOT) in the user utterance can be correctly calculated is higher. However, end determinations using lexical features require more time for determination than end determinations using acoustic features, and the waiting time (hereinafter, sometimes referred to as "delay" or "delay time") often occurs.

FIG. 1 is a diagram illustrating an example of a problem resulting from the waiting time described above. As illustrated in FIG. 1, the words 120 that constitute the utterance of the user 110 flow together with time. The Automatic Speech Recognition (ASR) partial output 112 is the words that are recognized by an automatic speech recognition technique during the user utterance. The end point detection 114 is a technique for detecting an EOT, BOP, or other end point in a user utterance. The response generation 116 is a response (machine utterance) generated by a dialog device.

In the example illustrated in FIG. 1, after the user 110 utters the words "From Kokubunji Station, umm" the user utterance temporarily ceases. Thus, the dialog system detects the end point in the user utterance, but since it takes processing time to determine whether this end point is a BOP or an EOT and to generate an appropriate response, a delay 130 may occur until a response on the side of the system is issued, thereby impairing the naturalness of the dialog.

In order to solve the above-described problem, in the present invention, the end point of the user utterance is determined based on a length attribute of an utterance predicted with respect to a temporal feature of the next utterance of the user, and by selecting at least one of an acoustic feature model or a lexical feature model for this purpose, the waiting time of the user can be shortened, and a more natural dialog between the user and the dialog device can be realized.

Next, with reference to FIG. 2, a functional configuration of a dialog device according to an embodiment of the present invention will be described.

Figure 2:
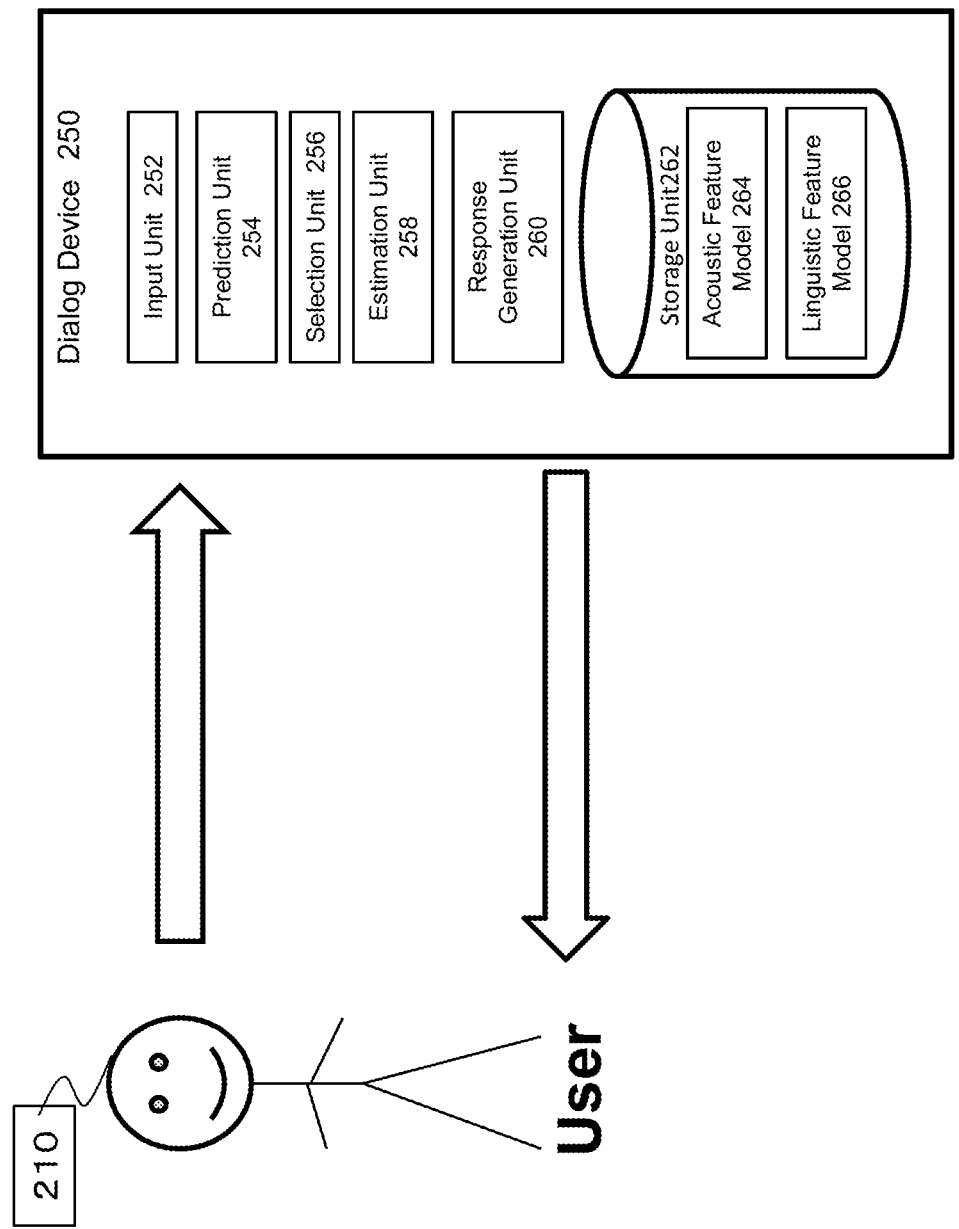
FIG. 2 is a diagram illustrating a functional configuration of a dialog device according to an embodiment of the present invention.

FIG. 2 is a diagram illustrating a functional configuration of a dialog device 250 according to an embodiment of the present invention. The dialog device 250 is a computing device configured to monitor information from a human user 210 using natural language. The dialog device 250 may be, for example, a task-oriented dialog system aimed at accomplishing a particular task, or may be a non-task-oriented dialog system capable of realizing conversations on any topic, such as chatting.

As an example, the dialog device 250 may be a terminal installed in a bank, for example, and may be configured to open an account, transfer money, or the like, or may be configured to check-in and guide passengers at an airport.

As illustrated in FIG. 2, the dialog device 250 includes an input unit 252, a prediction unit 254, a selection unit 256, an estimation unit 258, and a response generation unit 260.

The input unit 252 is a functional unit configured to input an utterance spoken by a human user 210 in natural language speech. The input unit 252 may be, for example, a microphone that receives utterances such as "Where is the nearest station?" or "I'd like to eat Chinese food; are there any good places nearby?".

The prediction unit 254 is a functional unit configured to predict long and short attributes of a next utterance of a user (for example, a next utterance of the user in response to a machine utterance). Here, the "utterance length attribute" refers to information indicating the length (length in terms of time or length in terms of the number of words) of the next utterance of the user. The utterance length attribute may be, for example, binary information indicating whether or not the next utterance of the user satisfies a predetermined length criterion (for example, 10 words or more, 5 seconds or more), or information indicating the estimated length (14 words, 7 seconds) of the next utterance of the user. Details of the processing in which the prediction unit 254 predicts the length attribute of the next utterance of the user will be described later.

The selection unit 256 is a functional unit that uses the utterance length attributes to select at least one of an acoustic feature model or a lexical feature model as the feature model to be used for the end determination of the user utterance. The selection unit may be configured to set a weighting for each of the acoustic feature model and the lexical feature model based on, for example, the utterance length attributes predicted by the prediction unit 254 (and/or a confidence value indicating the probability that the estimation of the end point is correct), and to select the model that achieves a predetermined weighting criterion. Details of the process in which the selection unit 256 selects the model used for the end determination of the user utterance will be described later.

The estimation unit 258 is a functional unit that estimates the end point in the user utterance using the model selected by the selection unit 256. Using the selected model, the estimation unit 258 may calculate the probability that the end point in the user utterance is a backchannel opportunity (BOP) and the probability that the end point is the utterance termination (EOT), and may generate a timing label that serves as metadata indicating the result of this calculation. Details of the processing by which the estimation unit 258 estimates the end point in the user utterance will be described later.

The response generation unit 260 is a functional unit configured to generate a machine utterance in response to a user utterance received by the input unit 252. This machine utterance may include, for example, a backchannel such as "Yes," "I understand," "Certainly," "Oh, okay," "Yeah, that's right," or the like to indicate that the user utterance has been received, or a response generated by a natural language generation technique in accordance with the content of the user utterance, such as "The nearest station is 700 meters from here," "There aren't any Chinese restaurants nearby, but how about Vietnamese food?" or the like.

Alternatively, in a case in which the dialog device is connected to a robot and configured to control the robot, the machine utterance may be an operation in which the face of the robot nods. In addition, in the case of an embodiment in which the dialog device is connected to a display device, such as a monitor, and a character is displayed on the monitor, the machine utterance may include generating an animation of the character on the display. Details of the processing in which the response generation unit 260 generates the response will be described later.

The storage unit 262 is a storage unit for storing various data used by the above-described functional units. The storage unit 262 may store, for example, a history of dialog with users in the past, a database used when generating utterances, or the like. The storage unit 262 may be any storage medium such as a flash memory or a hard disk drive. In addition, as illustrated in FIG. 2, the storage unit 262 may store an acoustic feature model 264 and a lexical feature model 266. However, the present invention is not limited thereto, and the acoustic feature model 264 and the lexical feature model 266 may be stored in a remote server and accessed via a communication network such as the Internet or LAN.

Next, with reference to FIG. 3, a hardware configuration of a computer system 300 that constitutes a dialog device according to an embodiment of the present invention will be described.

Figure 3:
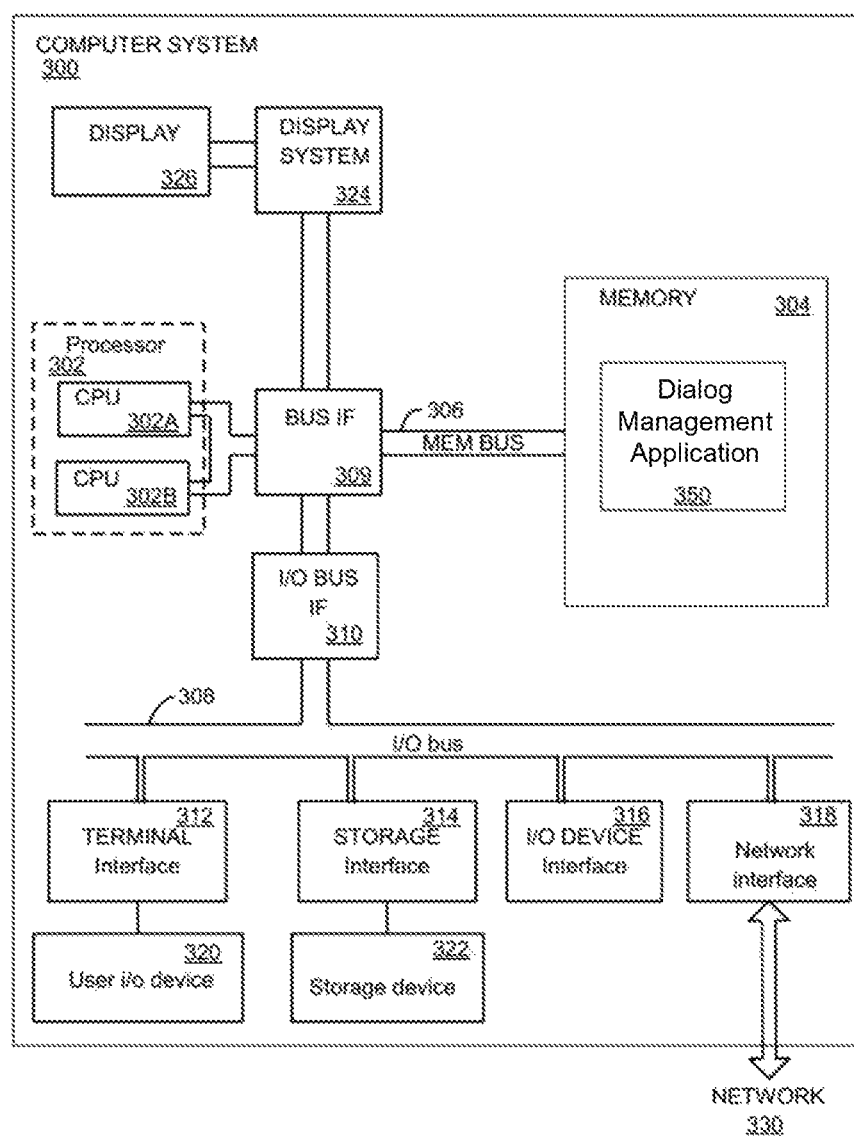
FIG. 3 is a block diagram of a computer system for implementing embodiments of the present invention.

FIG. 3 is a diagram illustrating a hardware configuration of a computer system 300 for implementing the embodiment of the present invention. The functionality of the dialog devices disclosed herein may be implemented by any computing system. In the following, a general-purpose computer system 300 configured to perform the functions of the dialog device according to the present invention will be described.

The main components of the computer system 300 include one or more processors 302, a memory 304, a terminal interface 312, a storage interface 314, an I/O (Input/Output) device interface 316, and a network interface 318. These components may be interconnected via a memory bus 306, an I/O bus 308, a bus interface unit 309, and an I/O bus interface unit 310.

Computer system 300 may include one or more general purpose programmable central processing units (CPUs) 302A and 302B, herein collectively referred to as the processor 302. In some embodiments, the computer system 300 may include multiple processors, and in other embodiments, the computer system 300 may be a single CPU system. Each processor 302 executes instructions stored in the memory 304 and may include an on-board cache.

In some embodiments, the memory 304 may include random access semiconductor memory, storage devices, or storage media (either volatile or nonvolatile) for storing data and programs. The memory 304 may store all or part of the programs, modules, and data structures that perform the functions described herein. For example, the memory 304 may store a dialog management application 350. In some embodiments, the dialog management application 350 may include instructions or statements that execute on the processor 302 to carry out the functions described below.

In some embodiments, the dialog management application 350 may be implemented in hardware via semiconductor devices, chips, logic gates, circuits, circuit cards, and/or other physical hardware devices in lieu of, or in addition to, processor-based systems. In some embodiments, the dialog management application 350 may include data in addition to instructions or statements. In some embodiments, a camera, sensor, or other data input device (not illustrated) may be provided to communicate directly with the bus interface unit 309, the processor 302, or other hardware of the computer system 300.

Computer system 300 may include a bus interface unit 309 to handle communications among the processor 302, the memory 304, the display system 324, and the I/O bus interface unit 310. The I/O bus interface unit 310 may be coupled with the I/O bus 308 for transferring data to and from the various I/O units. The I/O bus interface unit 310 may communicate with a plurality of I/O interface units 312, 314, 316, and 318, which are also known as I/O processors (IOPs) or I/O adapters (IOAs), via the I/O bus 308.

The display system 324 may include a display controller, a display memory, or both. The display controller may provide video, audio, or both types of data to the display device 326. The computer system 300 may also include a device, such as one or more sensors, configured to collect data and provide the data to the processor 302.

For example, the computer system 300 may include biometric sensors that collect heart rate data, stress level data, and the like, environmental sensors that collect humidity data, temperature data, pressure data, and the like, and motion sensors that collect acceleration data, exercise data, and the like. Other types of sensors may also be used. The display system 324 may be connected to a display device 326, such as a single display screen, a television, a tablet, or a portable device.

The I/O interface unit is capable of communicating with a variety of storage and I/O devices. For example, the terminal interface unit 312 may support the attachment of one or more user I/O devices 320, which may include user output devices such as video display devices, speakers, and televisions, or user input devices, which may include a keyboard, mouse, keypad, touchpad, trackball, buttons, light pens, or other pointing devices. A user may manipulate the user input devices using a user interface in order to provide input data and commands to the user I/O device 320 and the computer system 300 and may receive output data from the computer system 300. For example, the user interface may be displayed on a display device, played via a speaker, or printed via a printer via the user I/O device 320.

The storage interface 314 supports the attachment of one or more disk drives or direct access storage devices 322 (which are typically magnetic disk drive storage devices, although they could also be an array of disk drives or other storage devices configured to appear as a single disk drive). In some embodiments, the storage device 322 may be implemented via any type of secondary storage device. The contents of the memory 304 may be stored in the storage device 322 and read from the storage device 322 as necessary. The I/O device interface 316 may provide an interface to other I/O devices such as printers, fax machines, or the like. The network interface 318 may provide a communication path for the computer system 300 and other devices to communicate with each other. This communication path may be, for example, the network 330.

In some embodiments, the computer system 300 may be a device that receives requests from other computer systems (clients) that do not have a direct user interface, such as a multi-user mainframe computer system, a single-user system, or a server computer. In other embodiments, the computer system 300 may be a desktop computer, a portable computer, a notebook computer, a tablet computer, a pocket computer, a telephone, a smartphone, or any other suitable electronic device.

Next, with reference to FIG. 4, an overall flow of a dialog method according to an embodiment of the present invention will be described.

Figure 4:
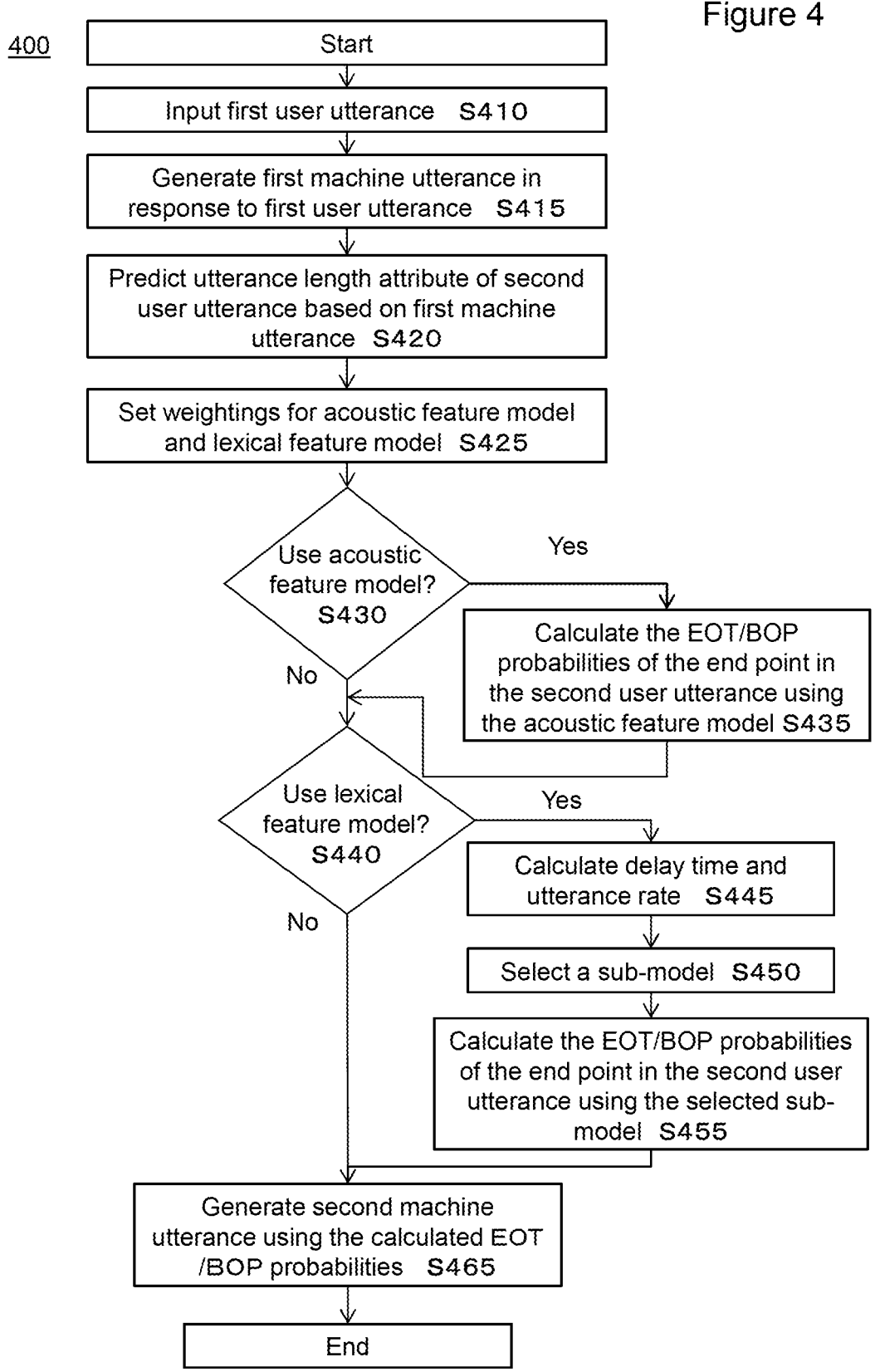
FIG. 4 is a diagram illustrating a flow of a dialog method according to an embodiment of the present invention.

FIG. 4 illustrates an overall flow of a dialog method 400 according to an embodiment of the present invention. As described above, the dialog method 400 relates to reducing the waiting time of a user until the response of a dialog device in a dialog between a user and a dialog system or dialog device by selecting, from an acoustic feature model or a lexical feature model, a model for determining the end point of a user utterance based on an utterance length attribute predicted for the next utterance of the user.

Details of the steps of the dialog method 400 are described below.

First, in step S410, the input unit (for example, the input unit 252 illustrated in FIG. 2) receives an input of a first user utterance. Here, the first user utterance may be any arbitrary words including a comment, dialog, a statement, a greeting, a remark, or the like in a dialog between a user and a dialog device. As described above, this first user utterance may include, for example, "Where is the nearest station?" or "I'd like to eat Chinese food; are there any good places nearby?" or the like.

Next, in step S415, the response generation unit (for example, the response generation unit 260 illustrated in FIG. 2) generates a first utterance (hereinafter, also referred to as a "machine utterance") from the dialog device side in response to the first user utterance input in step S410. The first machine utterance is a response generated by the dialog device in response to the first user utterance. As described above, the first machine utterance may be a backchannel, or may be an utterance generated by a natural language generation unit in accordance with the content of the first user utterance. Here, "generate" refers to the act of creating a machine utterance, and does not include outputting the machine utterance to the user. Accordingly, at the time of S415, the first machine utterance is created in the reply generation unit, but is not yet output at this time.

The first machine utterance corresponds to at least one of a plurality of utterance actions. Generally speaking, an utterance action indicates the intention of an utterance (of a user or a dialog device), and defines the type of the intention or purpose from the content of the utterance. Table 1 below illustrates examples of machine utterances and utterance actions corresponding to the machine utterances. As will be described later, which utterance the first machine utterance corresponds to is managed by the response generation unit, and this utterance is used in Step S420 to be described later.

TABLE 1

| Examples of Machine Utterance | Examples of Utterance Action |
| --- | --- |
| "Hello," "Welcome" | Greeting |
| "I recommend hotels around Tokyo Station." | Inform |
| "Is XYZ your correct address?" | Yes/No question |
| Yes | Yes/No response |
| "What kind of hotel are you looking for?" | Open questions |

Next, in step S420, the prediction unit (for example, the prediction unit 254 illustrated in FIG. 2) predicts an utterance length attribute for a second user utterance, which is a user utterance that responds to the first machine utterance generated in step S415.

As described above, in the present invention, the utterance length attribute is information indicating the length (length in terms of time or length in terms of the number of words) of a user utterance (that is, the second user utterance which is the next utterance of the user).

In the following description, for convenience of description, utterances satisfying a predetermined time criterion (for example, 5 seconds) or a predetermined word count criterion (for example, 5 words) will be described as utterances belonging to a category of "long," and utterances not satisfying a predetermined time criterion or a predetermined word count criterion will be described as utterances belonging to a category of "short." However, these "long" and "short" criterion values are for convenience of explanation only, and are not intended to limit the present invention in any way.

More particularly, the prediction unit predicts the length (long or short) of a second user utterance that the user will speak next by referencing the utterance action of the first machine utterance described above with respect to a history of stored dialog data (big data, as it is known). For example, in a case that the first machine utterance is a yes-no question, since there is a high likelihood that the second user utterance will be an utterance that briefly affirms or negates the query of the first machine utterance, it can be predicted that there is a high probability that the second user utterance will belong to the category of "short."

Also, in contrast, in a case that the first machine utterance is an open question, since there is a high likelihood that the second user utterance will not be an utterance that briefly affirms or negates the query of the first machine utterance, but is likely to include descriptive information, it can be predicted that there is a high probability that the second user utterance will be belong to the category of "long."

As will be described later, by using the utterance length attributes predicted in step S420, it is possible to select an appropriate model for calculating the end point in a user utterance.

Table 2 below shows the correspondence between the utterance action of the first machine utterance and the length attribute of the second user utterance.

It should be noted that the correspondence relationship illustrated in Table 2 is only an example, and which utterance action corresponds to which utterance length attribute may be appropriately modified depending on the circumstances of the dialog.

TABLE 2

| Examples of Utterance Action | Examples of Utterance Length Attributes |
| --- | --- |
| Greeting | Short |
| Inform | Long |
| Yes/No questions | Short |
| Open questions | Long |

It should be noted that, in the above description, a case was described in which the utterance length attribute of the second user utterance was predicted based on the utterance action of the first machine utterance, but the present invention is not limited to this. For example, after the first machine utterance is output, a portion of the second user utterance may be analyzed by an automatic speech recognition technique, and the utterance length attribute may be determined with reference to the partial result of the analysis of the automatic speech recognition technique. In this way, by predicting the utterance length attribute in real time based on an ongoing user utterance, the utterance length attributes can be predicted more accurately.

Next, in step S425, the selection unit (for example, the selection unit 256 illustrated in FIG. 2) sets weightings for the acoustic feature model and the lexical feature model. These weightings may be represented by a number from 0 to 1, for example, and a higher weighting for a model means that this model is more appropriate for determining the end point in an utterance. The weightings may be calculated and set based on, for example, the utterance length attribute of the second user utterance predicted in step S420 and a confidence value indicating the probability that the estimation of the end point by the model is correct.

As described above, termination determination using the lexical feature model has a higher accuracy than termination determination using the acoustic feature model, and has a high probability of correctly calculating the end points (BOP and EOT) in the user utterance, but the processing time is longer. On the other hand, termination determination using the acoustic feature model does not have accuracy as high as that of the lexical feature model, but the processing time is short. These features are described in Table 3 below.

TABLE 3

| Feature type | Delay | End point determination accuracy |
| --- | --- | --- |
| Speech | Short | Low |
| Lexical | Long | High |

As for the utterance length attribute of the second user utterance, in cases in which the second user utterance is indicated to be "short," the accuracy of the utterance end determination using the acoustic feature model is sufficient, but in cases in which the utterance length attribute for the second user utterance is indicated to be "long," the accuracy of utterance end determination using the acoustic feature model may become insufficient. Accordingly, in principle, in cases in which the second user utterance is predicted to be short, the weighting of the acoustic feature model is set to be higher than that of the lexical feature model, and in cases in which the second user utterance is predicted to be long, the weighting of the lexical feature model is set to be higher than that of the acoustic feature model. Details of the calculation and setting of the weighting will be described later.

Next, at step S430, the selection unit determines whether or not to utilize the acoustic feature model as the feature model used for the termination determination of the user utterance. Here, the selection unit may refer to the weighting of the acoustic feature model and determine to use the acoustic feature model when this value is equal to or greater than a predetermined criterion (for example, greater than or equal to 0.51). Alternatively, the acoustic feature model may always be used regardless of the weighting. In the case that the acoustic feature model is used, the process proceeds to step S435.

If the acoustic feature model is selected in step S430, then in step S435, the estimation unit (for example, the estimation unit 258 illustrated in FIG. 2) uses the acoustic feature model to calculate the end point in the second user utterance.

More particularly, when the second user utterance is uttered by the user, the acoustic feature model may analyze an acoustic feature such as a Mel frequency cepstrum coefficient or the pitch of the utterance, calculate a probability that an end point in the second user utterance is a backchannel opportunity (BOP), calculate a probability that an end point is an utterance termination (EOT), and generate a timing label that serves as metadata indicating the result of this calculation.

In this way, when the second user utterance is predicted to be short, the acoustic feature model can estimate end points with favorable accuracy, such that the probabilities of EOT and BOP can be quickly calculated with high accuracy.

That is, end determinations using a lexical feature model have higher accuracy than end determinations using an acoustic feature model, and have a higher probability of correctly calculating the end points (BOP and EOT) in the user utterance, but have a problem in that the processing time is longer.

Accordingly, in the present invention, in order to cope with the long processing time of the lexical feature model, a "subsequent word number prediction model" is used to predict, during a user utterance, how many words later the current utterance will end from the current point in time. By using this subsequent word number prediction model, it is possible to reduce the delay until the response of the dialog device is generated by predicting in advance how many words later the utterance will end in, and starting the processing of generating the response of the dialog device earlier.

The subsequent word number prediction model is selected from among a plurality of sub-models based on the utterance rate of the user (how many words are uttered per second on average) and the time required to generate the response from the dialog device (that is, the delay time). Each sub-model is a machine learning model trained to estimate the end point in a user utterance a predetermined number of words earlier. For example, the subsequent word number prediction model may include a sub-model for each arbitrary word number, such as a 5-word sub-model trained to estimate that the end point in the user utterance is 5 words later, or a 3-word sub-model trained to estimate that the end point in the user utterance is 3 words later.

In step S440 and step S445, the estimation unit calculates the utterance rate of the user and the time required to generate the machine utterance (that is, the delay time). For example, the estimation unit may calculate the utterance rate of the user by analyzing a dialog history with a particular user in order to measure how many words the user utters per second. In addition, the estimation unit may also estimate a second machine utterance, (that is, the next response of the dialog device in response to the second user utterance) based on the utterance action of the second user utterance.

Next, in step S450, the selection unit selects, from among a plurality of sub-models of the subsequent word number prediction model, an appropriate sub-model based on the utterance rate of the user and the delay time calculated at step S445.

In particular, by multiplying the utterance rate and the delay time, the selection unit can select a sub-model that matches the number of words resulting from this multiplication. For example, if the delay time is one second and the user utters three words in one second on average, the selection unit may select a 3-word sub-model. In this way, since the end point of the user utterance is predicted three words in advance, by starting the process of generating the response of the dialog device at this point in time (that is, one second before the end of the utterance), the response of the dialog device can be output immediately after the end of the user utterance.

Next, in step S455, the estimation unit calculates an end point in the second user utterance using the selected sub-model. In particular, when the second user utterance is uttered by the user, the sub-model may analyze lexical features such as words, phonemes, morphemes, or the like of the utterance, calculate a probability that the end point in the second user utterance is a backchannel opportunity (BOP), a probability that the end point is an utterance termination (EOT), and generate a timing label that serves as metadata indicating a result of this calculation.

Next, in step S465, the estimation unit generates a second machine utterance in response to the second user utterance using the EOT probability and the BOP probability calculated at S435 and S455. As the probability to be used here, in a case that one of either the acoustic feature model or the lexical feature model is used, the probability obtained therefrom can be used directly.

In addition, in a case that both the acoustic feature model and the lexical feature model are used, after weighting of each feature has been performed with respect to both probabilities, then a value obtained by adding these two values together can be used. In addition, for example, in a case that the probability of the BOP is higher than the probability of the EOT, the estimation unit may generate an utterance that provides a backchannel such as "Yes" or "Oh, okay," and in a case that the probability of the EOT is higher than the probability of the BOP, the estimation unit may generate an utterance in accordance with the content of the user utterance using a natural language processing technique. Subsequently, the estimation unit outputs the second machine utterance.

According to the dialog method described above, it is possible to reduce the waiting time of a user by selecting, from either an acoustic feature model or a lexical feature model, a model for determining the end point of a user utterance based on a prediction of a length attribute of the next utterance of a user.

Next, with reference to FIG. 5, an example of a dialog in the dialog device according to an embodiment of the present invention will be described.

Figure 5:
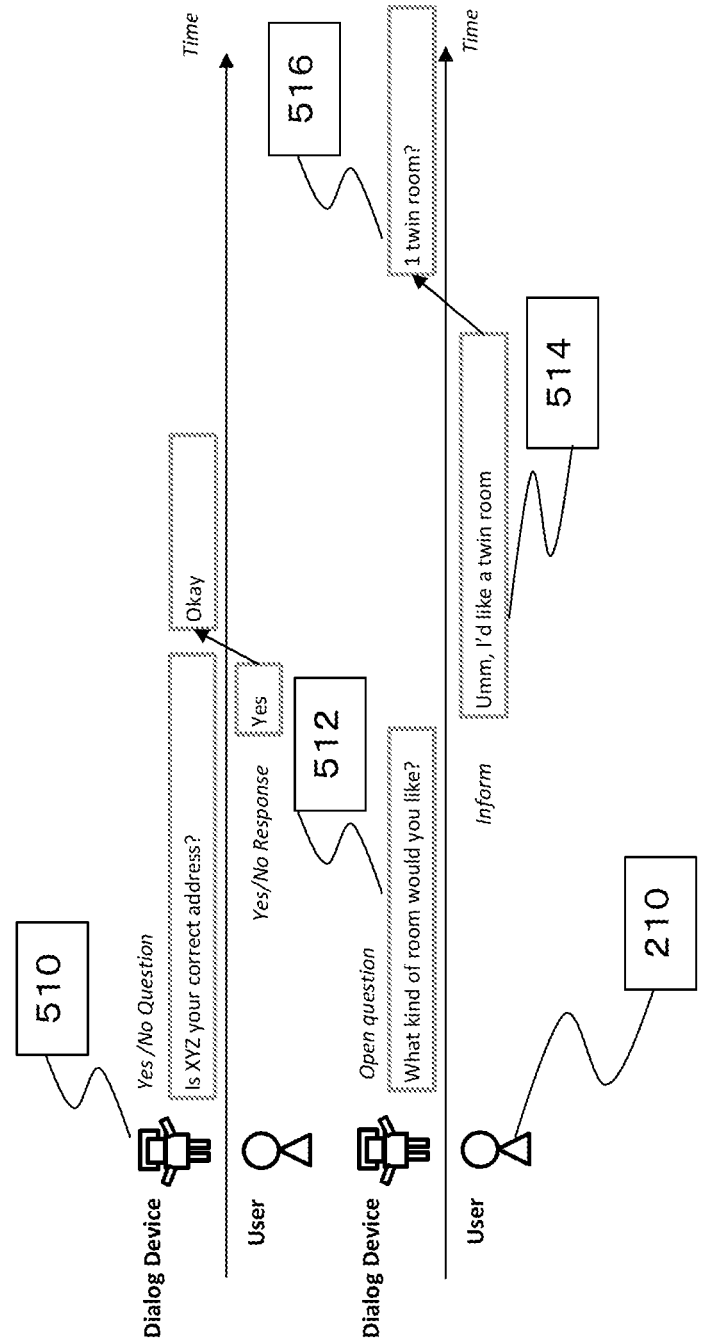
FIG. 5 is a diagram illustrating an example of a dialog in the dialog device according to an embodiment of the present invention.

FIG. 5 is a diagram illustrating an example of a dialog 500 in a dialog device according to an embodiment of the present invention. FIG. 5 illustrates the dialog of a human user 210 with a dialog device 510. Here, the "dialog device" has the same function as the dialog device 250 illustrated in FIG. 2, for example.

An example of the dialog illustrated in FIG. 5 may be, for example, a conversation in which the user 210 uses the dialog device 510 to perform a process for reserving a hotel. As illustrated in FIG. 5, the dialog device 510 emits an utterance 512 saying "What kind of room would you like?" This utterance corresponds to an utterance action of "open type question." As described above, the dialog device 510 can predict the length attribute of the next user utterance based on the utterance action.

For example, here, since the utterance uttered by the dialog device 510 corresponds to an utterance action of an open question, since there is a high possibility that the next utterance 514 of the user will correspond to an utterance action of "inform," the utterance length attribute is predicted to be long, and the lexical feature model, which is suitable for the determination of end points in long utterances, may be selected. Next, the dialog device 510 may then use the selected lexical feature model to determine the end point in the user utterance 514 and generate the next machine utterance 516 according to the process described with reference to FIG. 4.

It should be noted that, although an example has been described above based on the assumption that the next utterance of the user will correspond to only one utterance, in reality, there are cases in which there a plurality of candidates of utterance actions to which the next utterance of the user may correspond, and the utterance action of the next utterance of the user cannot be predicted with a probability of 100%. Accordingly, when a plurality of candidate utterance actions exist for one user utterance, the dialog device 510 can predict the utterance action having the highest occurrence probability by predicting the number of candidate utterance actions that may occur, and calculating a weighted sum of the probability that each of the predicted candidate utterance actions occurs and the anticipated utterance length attribute of each utterance action.

In addition, the dialog device 510 may also calculate the entropy of the utterances using the probabilities of occurrence of each of the predicted candidate utterances. The entropy is obtained by the following Equation 1.

$$H = -\sum_{i=1}^{I} p_i \log p_i \qquad \text{[Equation 1]}$$

In Equation 1, H is the entropy, I is the number of candidate utterance actions that may occur, and $p_i$ is the probability of the i-th utterance act occurring. In general, this entropy is a measure of information disorder, ambiguity, and uncertainty, and the higher the entropy, the more difficult it is to predict a particular result.

Accordingly, here, when the entropy is low, the number of utterance actions that may appear is small, and it is easy to specify which utterance action will appear. In contrast, when the entropy is high, the number of utterance actions that may occur is large, and it is difficult to specify which utterance action will occur. In this case, the utterance action of the next utterance of the user may be predicted by setting the weighting of lexical features higher, by considering the occurrence rate of the types of the utterance length attribute (long or short) of the predicted candidate utterance action, or by training the lexical feature model for each domain using the entropy.

As a result, even in cases in which a plurality of candidate utterance actions exist for one user utterance, it is possible to predict the length attribute of the user utterance and appropriately select a model to be used for the end determination in the user utterance.

Next, with reference to FIG. 6, a description will be given of a process of calculating the weightings of the acoustic feature model and the lexical feature model according to an embodiment of the present invention.

Figure 6:
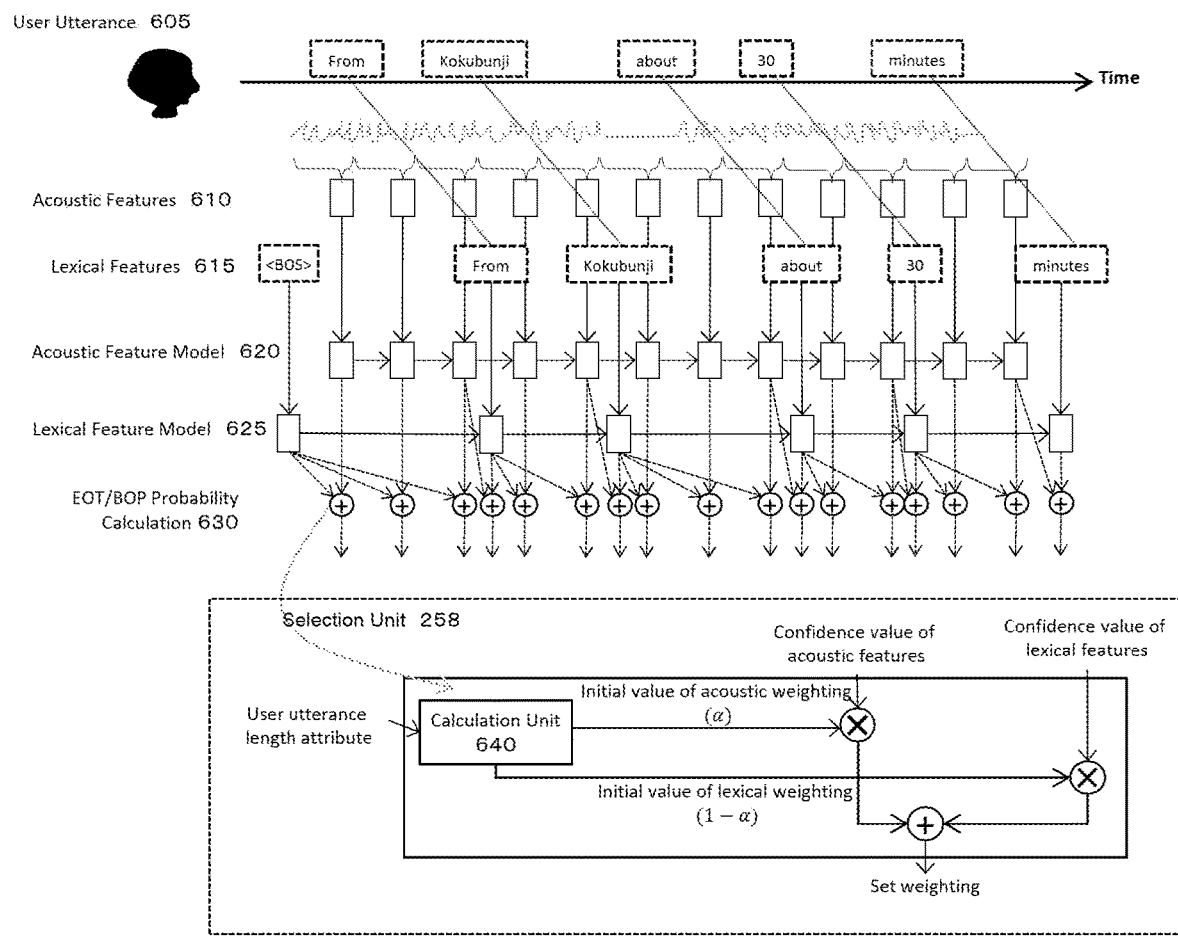
FIG. 6 is a diagram illustrating an example of a process of calculating weights of an acoustic feature model and a lexical feature model according to an embodiment of the present invention.

FIG. 6 is a diagram illustrating an example of a process for calculating the weights of an acoustic feature model and a lexical feature model according to an embodiment of the present invention. As illustrated in FIG. 6, the user utterance 605 flows together with time. The input unit (not illustrated in the Figures) acquires the acoustic features 610 and the lexical features 615 of the user utterance 605, respectively. As described above, whether the acoustic features 610 are used by the acoustic feature model 620 to determine the end point in the utterance, or the lexical features 615 are used by the lexical feature model 625 to determine the end point in the utterance is determined by the weightings set for the acoustic feature model 620 and the lexical feature model 625. Hereinafter, the process of calculating these weightings will be described.

As described above, the weighting here is represented by a number from 0 to 1, for example, and a higher weighting for a model means that this model is more appropriate for determining the end point in an utterance. The weighting may be calculated based on the predicted utterance length attribute of the next utterance of the user and a confidence value indicating the probability that the estimation of the end point by the model is correct.

As described above, the utterance length attribute is information that indicates the length (long or short) of the next utterance of the user, and is predicted by the processing described with reference to FIG. 4. The calculation unit 640 illustrated in FIG. 6 is configured to set the weighting α of the acoustic feature model higher than the weighting of the lexical feature model (1−α) in a case that it is determined that the next utterance of the user is short based on the predicted utterance length attribute, and to set the weighting of the lexical feature model higher than the weighting of the acoustic feature model in a case that it is determined that the next utterance of the user is long.

Although a case in which the weighting of the acoustic feature model and the lexical feature model was calculated based only on the length attribute of the user utterance has been described above, the weighting of the acoustic feature model and the lexical feature model may be calculated based on both the utterance length attribute and a confidence value indicating the probability that the estimation of the end point by the model is correct. In this case, it is possible to more accurately select the model for determining the end point in the utterance in comparison with the case where the weighting is calculated based only on the utterance length attribute.

Hereinafter, a case will be described in which the weightings of the acoustic feature model and the lexical feature model are calculated based on both the utterance length attributes and the confidence value.

First, the calculation unit 640 calculates a confidence value indicating the probability that the estimation of the end point of a particular model is correct. The calculation of the confidence value may be based on the signal-to-noise ratio of the input utterance. For example, since lexical features are greatly affected by noises such as reverberation, the confidence value of lexical features is low when the input voice includes a large amount of reverberation. In contrast, since acoustic feature are not greatly affected by reverberations, even in cases that the input utterance includes reverberations, the confidence value of acoustic features may be set to be high.

It should be noted that, although a case in which the confidence values of the acoustic feature model and the lexical feature model were calculated based on the signal-to-noise ratio has been described above, the present invention is not limited thereto, and these confidence values may be calculated based on parameters such as the accuracy of automatic speech recognition or the like.

Hereinafter, a technique for calculating the above-mentioned weightings based on the predicted utterance action and the confidence value of the model will be described. In a case in which the weighting $\alpha_A$ of the acoustic feature model is calculated based only on the length attribute of the next utterance of the user, the overall weighting α can be obtained by the following Equations 2, 3, and 4.

$$\alpha = \alpha_A \ (\text{if } d < d_A) \qquad \text{[Equation 2]}$$

$$\alpha = \frac{\alpha_A - \alpha_L}{d_A - d_L}d + \alpha_A - \frac{\alpha_A - \alpha_L}{d_A - d_L}d_A \ (\text{if } d_A \leq d \leq d_L) \qquad \text{[Equation 3]}$$

$$\alpha = \alpha_L \ (\text{if } d > d_L) \qquad \text{[Equation 4]}$$

Here, $\alpha_L$ is the weighting of the lexical feature model, d is a variable indicating an anticipated length of an utterance, $d_A$ is a threshold value of the utterance length which is considered to be a short utterance, and $d_L$ is a threshold value of the utterance length which is considered to be a long utterance.

When the weighting $\alpha_A$ of the acoustic features is calculated based on the speech behavior of the user, the overall weighting α is calculated by the following Equation 5.

$$\alpha = f_{DA}(U) \qquad \text{[Equation 5]}$$

Here, U represents a predicted utterance action $u_i$ and the corresponding occurrence probability $p_i$, and $f_{DA}$ is a predetermined function for converting the utterance action into a weighting. Further, U is obtained by the following Equation 6.

$$U = [(u_1, p_1), (u_2, p_2), \ldots, (u_i, p_i), \ldots, (u_I, p_I)] \qquad \text{[Equation 6]}$$

The weighting α described above is an initial value of the weighting, and may be continuously updated as time passes. When the confidence value $c_A$ of the acoustic feature model and the confidence value $c_L$ of the lexical feature model are normalized within the range of 0 to 1, and the sum of these values is set to 1, the weighting $\alpha_t$ at a certain time period t is obtained by the following equations 7 and 8.

$$\alpha_t = \min(1, \alpha_{t-1} + \alpha_{update+}) \text{ if } c_A > c_L \quad \text{[Equation 7]}$$

$$\alpha_t = \max(0, \alpha_{t-1} - \alpha_{update-}) \text{ if } c_A \leq c_L \quad \text{[Equation 8]}$$

Here, $\alpha_{update+}$ and $\alpha_{update-}$ are values to be added to or subtracted from the weights.

In addition, the weighting $\alpha_t$ at a certain time period t is obtained by the following equations 9, 10, and 11.

$$\alpha_t = \alpha_0 \text{ (if } t < t_0) \quad \text{[Equation 9]}$$

$$\alpha_t = \frac{\alpha_0 - \alpha_1}{t_0 - t_1} t + \alpha_0 - \frac{\alpha_0 - \alpha_1}{t_0 - t_1} t_0 \text{ (if } t_0 \leq t \leq t_1) \quad \text{[Equation 10]}$$

$$\alpha_t = \alpha_1 \text{ (if } t > t_1) \quad \text{[Equation 11]}$$

Here, $\alpha_0$ is the initial value of the weightings, $t_0$ is the time period before the weightings are updated, $t_1$ is the time zone after the weightings are updated, and $\alpha_1$ is the weighting after the weightings are updated.

By calculating the weightings of the acoustic feature model and the lexical feature model by the calculation described above, since a model capable of accurately estimating the end point in a particular user utterance can be selected, it is possible to reduce the waiting time of the user and realize a more natural dialog between a user and a dialog device.

Next, with reference to FIG. 7 and FIG. 8, an example of a subsequent word number prediction according to an embodiment of the present invention will be described.

As described above, when the lexical feature model is used for the end determination of an utterance, the end points BOP and EOT of the user utterance can be estimated with higher accuracy than the end determination using the acoustic feature model, but there is a problem in that that the processing time is longer. Accordingly, in order to cope with the long processing time of the lexical feature model, a "subsequent word number prediction model" is used to predict, during a user utterance, how many words later the end point of the utterance will come from that point. By using this subsequent word number prediction model, it is possible to shorten the delay until the machine utterance is generated by starting the process of generating the machine utterance earlier It should be noted that, since the flow of the processing of the subsequent word number prediction has been described with reference to FIG. 7, the description thereof will be omitted, and the technique for training the sub-models in the subsequent word number prediction model will be described.

As described above, the sub-models in the subsequent word number prediction model are machine learning models trained to estimate the end point in a user utterance a predetermined number of words earlier.

For example, the subsequent word number prediction model may have a sub-model trained for any arbitrary number of words n, such as a 5-word sub-model trained to estimate that the end point in the user utterance is 5 words later, or a 3-word sub-model trained to estimate that the end point in the user utterance is 3 words later.

Figure 7:
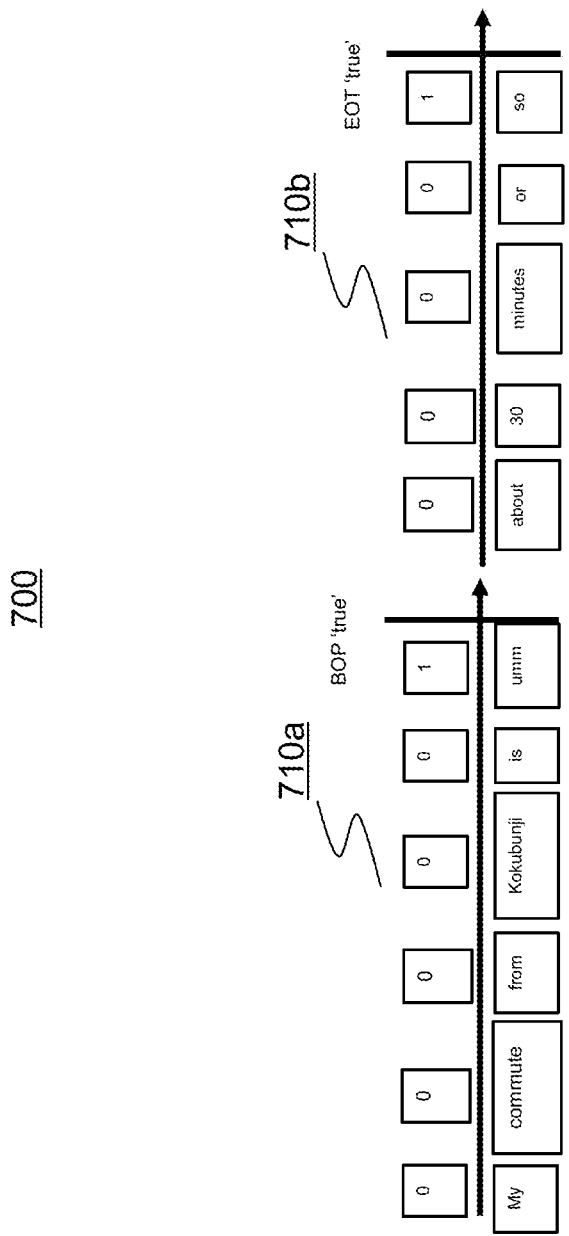
FIG. 7 is a diagram illustrating an example of training data for a subsequent word number prediction according to an embodiment of the present invention.

FIG. 7 is a diagram illustrating an example of a word string 700 for training a subsequent word number prediction model according to an embodiment of the present invention.

The word string 700 may include, for example, utterances extracted from dialog histories collected in the past, or utterances created for training purposes. As illustrated in FIG. 7, the word string 700 is provided with timing labels indicating BOP and EOT, which are the end points in the utterance. These end point labels serve as the ground truth (information defining the correct end points) that the sub-models should target in the training process of the sub-models.

In addition, as illustrated in FIG. 7, the word string 700 is divided into two sequences 710a and 710b to facilitate the training process. In principle, a word string is divided into separate sequences at each BOP. For example, if the word string contains three BOPs, it may be divided into three sequences.

By using a recursive neural network to train the above-described sub-models using the word string 700 as training data as illustrated in FIG. 7, it is possible to realize a sub-model in which the end point in an utterance can be predicted by an arbitrary number of words n in advance. In this training process, by minimizing the loss of the end determination of the in-training sub models with respect to the correct end determination as indicated by the timing labels of the word string 700, the determination accuracy of the sub-models can be improved. This loss is illustrated in Equation 12 below.

$$\text{Loss} = \sum_{i=1}^{L} -\lambda_i (w_{pos} p_i \log(q_i) + w_{neg}(1 - p_i) \log(1 - q_i)) \quad \text{[Equation 12]}$$

The $\lambda_i$ in Equation 12 is given by the following equation 13.

$$\lambda_i = \exp(-\max(0, L - n - i)) \quad \text{[Equation 13]}$$

Here, i is a number indicating the number of a specific sequence in a word string, and L is the number of words included in a sequence. n is a number indicating a desired number of words. $p_i$ is the ground truth of the i-th sequence, which is 1 for BOP or EOT, and 0 otherwise. $q_i$ is the probability value of the BOP or the EOT output for the i-th word of the sequence by the recursive neural network being trained, and is a probability value between 0 and 1. $w_{pos}$ and $w_{neg}$ are coefficients for balancing the training data. As a specific calculation method, for $w_{pos}$, the number of words to which an EOT or BOP label is not attached among the words in the sequences included in the training data is calculated, and a value obtained by dividing this number by the number of words to which an EOT or BOP label is attached is used as a $w_{pos}$. For $w_{neg}$, 1 is used.

In addition, in the word string 700 illustrated in FIG. 7, although data has been illustrated in which an EOT or BOP label has always been assigned to the last word, training data may include data in which no EOT or BOP labels exist on any of the words in the sequence. The loss when using such a sequences for training is indicated by the following equation 14:

$$\text{Loss} = \sum_{i=1}^{L} -\log(1 - q_i) \quad \text{[Equation 14]}$$

Finally, the loss calculated by equations 12 and 14 is added, and training is performed in order to minimize this loss.

Figure 8:
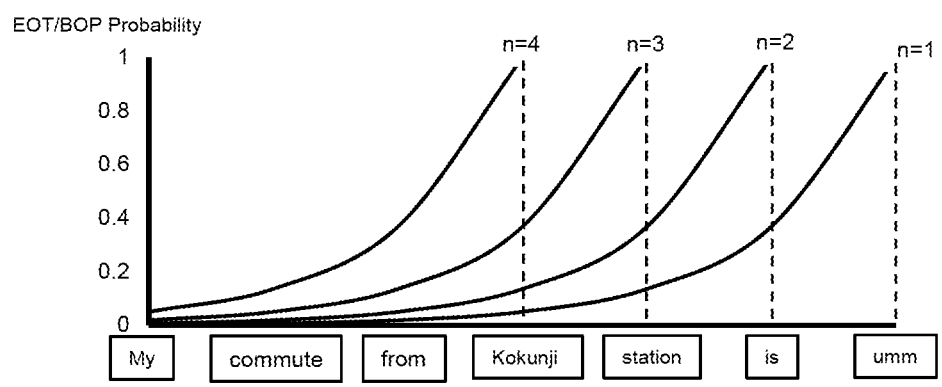
FIG. 8 is a diagram illustrating another example of subsequent word number prediction according to an embodiment of the present invention.

FIG. 8 is a graph illustrating the result of the end determination of a trained subsequent word number prediction sub-model. By training the subsequent word number prediction model with different word numbers n and minimizing the loss using the above equation 12, it is possible to realize a sub-model capable of accurately determining the end point in an utterance for each of a number of words n, such as 1 word before, 2 words before, 3 words before, and 4 words before, as illustrated in FIG. 8.

It should be noted that, although FIG. 8 exemplifies a case where four sub-models of n=1, n=2, n=3, and n=4 are trained, the present invention is not limited thereto, and any number of sub-models may be trained.

As described above, by selecting an appropriate sub-model from among the trained submodels based on the utterance speed of the user and the delay time due to the response generation processing, it is possible to estimate the end point of a user utterance in advance, and to start the processing of generating the response of the dialog device earlier. As a result, the delay time due to the lexical feature model can be shortened, and natural conversation between the user and the dialog device can be realized.

Next, generation of a machine utterance according to an embodiment of the present invention will be described with reference to FIG. 9.

Figure 9:
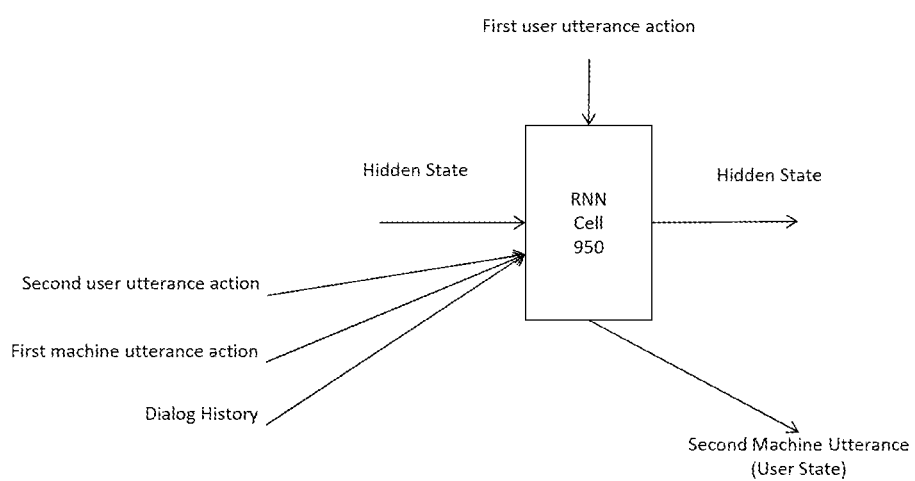
FIG. 9 illustrates an example of a cell in a recursive neural network adapted to estimate an end point in an utterance.

FIG. 9 is a diagram illustrating an example of a cell 950 in a recursive neural network adapted to estimate an end point in an utterance. As illustrated in FIG. 9, the cell 950 receives as inputs a dialog history that indicates the utterance action of the first user utterance determined from the result of the automatic speech recognition, the utterance action of the second user utterance predicted by the above-described prediction unit, the utterance action of the first machine utterance, and the dialog history. Each input may be represented, for example, as a vector.

For example, the dialog history may be represented as a vector of what is known as "belief states." This vector of a belief state is a vector that records the information (such as a request from the user, a proposal from the dialog device, or the like) up to the current point in a certain dialog in an aggregated state.

As illustrated in FIG. 9, the cell 950 may be configured to receive a hidden state of another cell in the neural network, and pass its own hidden state to other cells.

The cell 950 that has input the information illustrated in FIG. 9 generates a second machine utterance in response to the second user utterance. In a case that the end point in the user utterance is a BOP (backchannel opportunity), then this second machine utterance may be a backchannel such as "Yes," "Oh, okay," or the like, and in a case that the end point is an EoT (utterance termination), then this second machine utterance may be a response generated using natural language generation.

It should be noted that the output of the (RNN) cell 950 is not limited to the second machine utterance, and may include information indicating a state of the user. For example, the cell (RNN cell) 950 may analyze the input information, and output information that indicates a user state such as "the user is thinking" or "the user is consulting with a companion" as a vector. The response generation unit described above may then determine an appropriate machine utterance or other action based on the vector indicating the user state.

Next, a modified example of the calculation of the model weighting according to an embodiment of the present invention will be described with reference to FIG. 10.

Figure 10:
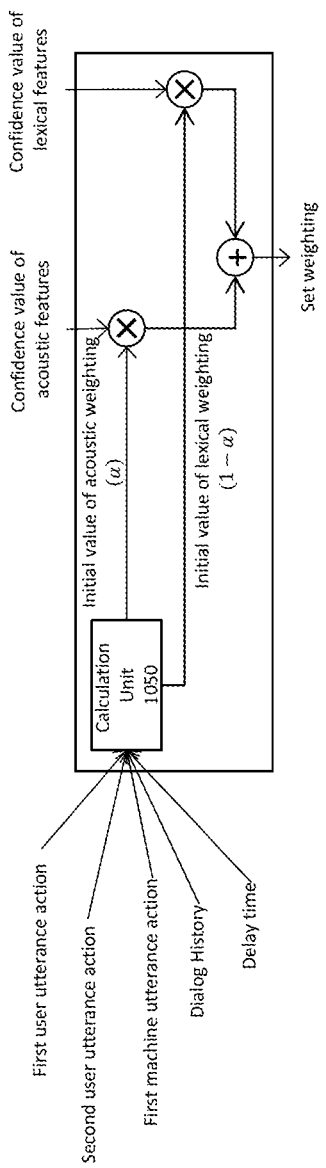
FIG. 10 is a diagram illustrating a modified example of the calculation of the model weighting according to an embodiment of the present invention.

FIG. 10 is a diagram illustrating a modified example of the calculation of the model weighting according to an embodiment of the present invention. In FIG. 6, the calculation unit 640 that calculates the weighting of the acoustic feature model and the lexical feature model using the utterance length attribute predicted by the prediction unit was described, but the calculation unit according to the present embodiment may assume the function of the prediction unit. In this case, since it is unnecessary to provide a dedicated function unit for predicting the utterance length attribute, it is possible to reduce the usage amount of the memory and the CPU.

As illustrated in FIG. 10, the calculation unit 1050 configured to assume the function of the prediction unit receives input of the utterance action of the first user utterance, the utterance action of the second user utterance, the utterance action of the first machine utterance determined from the result of the automatic speech recognition, a dialog history indicating the history of the dialog, the delay time resulting from the processing of the lexical feature model, the confidence value of the acoustic feature model, and the confidence value of the lexical feature model.

Subsequently, the calculation unit 1050 may estimate the length attribute of the user utterance based on the input of the utterance action information, and calculate the weightings of the lexical feature model and the acoustic feature model based on the estimated utterance length attributes, the delay time of the lexical feature model, the confidence value of the acoustic feature model, and the confidence value of the lexical feature model. Since the calculation of this weighting is substantially the same as the processing described with reference to FIG. 6, the description thereof is omitted.

Next, with reference to FIG. 11, a modified example of the calculation of the end point probability according to an embodiment of the present invention will be described.

Figure 11:
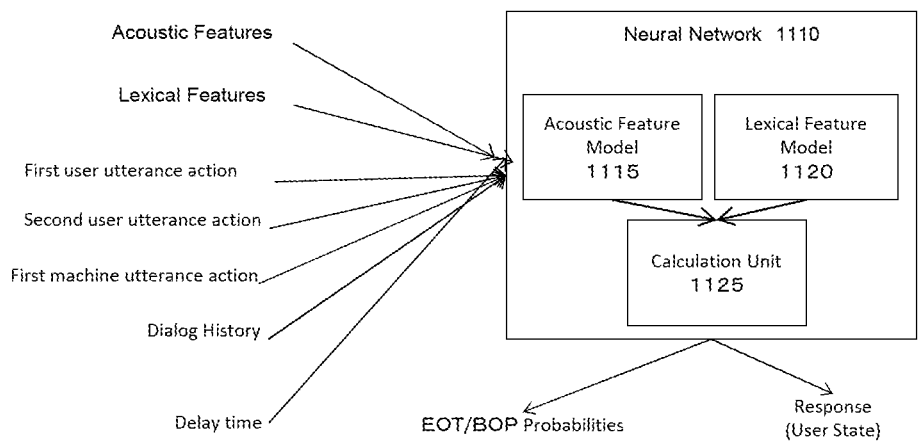
FIG. 11 is a diagram illustrating a modified example of the calculation of the end point probability according to an embodiment of the present invention.

FIG. 11 is a diagram illustrating a modified example of the calculation of the end point probability according to an embodiment of the present invention. Although the processing of estimating the end point of an utterance using either one of the acoustic features or the lexical features has been described above, the present invention is not limited thereto, and it is also possible to estimate the end point of the utterance using both the acoustic features and the lexical features.

When estimating the end point of the utterance using both the acoustic features and the lexical features, first, the neural network 1110 receives input of the acoustic features, the lexical features, the utterance behavior of the first user utterance determined from the result of the automatic speech recognition, the utterance behavior of the second user utterance, the utterance behavior of the first machine utterance, a dialog history that indicates the history of the dialog, and the delay time resulting from the processing of the lexical feature model.

Subsequently, each of the acoustic feature model 1115 and the lexical feature model 1120 calculates, in parallel using the input acoustic features and lexical features, the probability that the end point in the utterance is a backchannel opportunity (BOP) and the probability that the end point in the utterance is an utterance termination (EOT). Thereafter, the calculation unit 1125 may input the respective probabilities calculated by the acoustic feature model 1115 and the lexical feature model 1120, and calculate a weighted average value of these probabilities based on the weightings set for the acoustic feature model 1115 and the lexical feature model 1120, for example. The weighted average value may be output to the above-described response generation unit as a final probability value for the end point. Then, the response generation unit may generate the second machine utterance using this final probability value for the end point.

According to the embodiments described above, by selecting, from either an acoustic feature model or a lexical feature model, a model for determining the end point of a user utterance based on a prediction of a length attribute of the next utterance of the user, it is possible to reduce the waiting time of a user and to realize a more natural conversation between the user and the dialog device.

The functions of the embodiments according to the present invention may also be realized by program code of software. In this case, a storage medium on which program code for implementing the functions of the present invention is recorded may be supplied to a device or a system, and a computing device (CPU, MPU, or the like) installed in the device or the system may read and implement the program code. By executing the program code read from the storage medium by a computer in order to realize the functions of the above-described embodiments, the program code, the storage medium, and the computing device itself that are used to implement these functions constitute components of the present invention.

The storage medium for recording the program code includes, for example, a flexible disk, a CD-ROM, a DVD-ROM, a hard disk, an optical disk, a magneto-optical disk, a CD-R, magnetic tapes, non-volatile memory cards, ROM, or the like.

It is needless to say that the output of the dialog device is not limited to speech, and the questions and the responses may be presented to the user by a method such as displaying text on a screen.

Although the embodiments of the present invention have been described above, the present invention is not limited to the above-described embodiments, and various modifications can be made within a scope that does not depart from the gist of the present invention.

REFERENCE SIGNS LIST

210 User
250 Dialog device
252 Input unit
254 Prediction unit
256 Selection unit
258 Estimation unit
260 Response generation unit
262 Storage unit
264 Acoustic feature model
266 Lexical feature model

What is claimed is:

1. A dialog device comprising:
a prediction unit configured to predict an utterance length attribute comprising time duration or a number of words of a user utterance;
a selection unit configured to use the time duration or the number of words to select, as a feature model for usage in an end determination of the user utterance, at least one of an acoustic feature model or a lexical feature model; and
an estimation unit configured to estimate an end point of the user utterance using the feature model selected by the selection unit based on the time duration or the number of words of the user utterance.

2. The dialog device according to claim 1, wherein: the selection unit is configured to:
set weightings for the acoustic feature model and the lexical feature model based on the time duration or the number of words of the user utterance and a confidence value that indicates a probability that an estimation of the end point is correct; and
select, from either the acoustic feature model or the lexical feature model, a model that achieves a predetermined weighting criterion.

3. The dialog device according to claim 1, wherein:
the lexical feature model includes a plurality of sub-models;
the plurality of sub-models include machine learning models trained to estimate an end point in the user utterance a predetermined number of words earlier; and the selection unit is configured to:
calculate, when estimating the end point in the user utterance using the lexical feature model, a delay time from an end of the user utterance to an output of a machine utterance;
calculate an utterance rate of a user based on previous user utterances; and
select, based on the delay time and the utterance rate of the user, a sub-model from among the plurality of sub-models that is capable of reducing the delay time to within a predetermined time.

4. The dialog device according to claim 1, wherein:
the lexical feature model is configured to:
input, as a lexical feature, any one of a word, a phoneme, or a morpheme, and estimate an end point of the user utterance.

5. The dialog device according to claim 1, wherein both the acoustic feature model and the lexical feature model are configured to calculate:
a probability that the end point in the user utterance is a back-channel opportunity; and
a probability that the end point in the user utterance is an utterance termination.

6. The dialog device according to claim 5, wherein:
the dialog device further includes a response generation unit; and
the response generation unit is configured to:
generate and output a back-channel response in a case that a probability that the end point in the user utterance is a back-channel opportunity achieves a predetermined back-channel probability criterion; and
generate, in a case that a probability that the end point in the user utterance is an utterance termination achieves a predetermined termination probability criterion, a machine utterance generated by the dialog device in accordance with content of the user utterance using a natural language understanding technique.

7. The dialog device according to claim 1, wherein:
the prediction unit is configured to:
determine a machine utterance action indicating an intention of the machine utterance;
predict the user utterance based on the machine utterance act; and
predict the utterance length attribute of the user utterance by determining a user utterance action that indicates an intention of the user utterance.

8. The dialog device according to claim 1, wherein:
the acoustic feature model and the lexical feature model can be trained by a recursive neural network.

9. A dialog method comprising:
a step of receiving a first user utterance from a user;
a step of generating a first machine utterance in response to the first user utterance;

a step of predicting an utterance length attribute comprising a length of time or a number of words of a second user utterance in response to the first machine utterance;
a step of setting weightings for an acoustic feature model and a lexical feature model based on the length of time or the number of words and a confidence value that indicates a probability that an estimation of an end point in the second user utterance is correct;
a step of estimating, in a case that a weighting of the acoustic feature model satisfies a predetermined weighting criterion, an end point in the second user utterance using the acoustic feature model;
a step of calculating, in a case that a probability that a weighting of the lexical feature model calculated for a predetermined weighting criterion satisfies a predetermined probability criterion, a delay time from an end of the second user utterance to an output of the second machine utterance;
calculating an utterance rate of a user based on previous user utterances;
a step of selecting, based on the delay time and the utterance rate of the user, a sub-model from among a plurality of sub-models that is capable of reducing the delay time to within a predetermined time; and
a step of estimating an end point in the second user utterance using a selected sub-model.

10. A non-transitory computer readable medium storing computer readable instructions which, when executed by a computer causes the computer to perform the following:
a step of receiving a first user utterance from a user;
a step of generating a first machine utterance in response to the first user utterance;
a step of predicting an utterance length attribute comprising a time duration or a number of words of a second user utterance in response to the first machine utterance;
a step of setting weightings for an acoustic feature model and a lexical feature model based on the time duration or the number of words and a confidence value that indicates a probability that an estimation of an end point in the second user utterance is correct;
a step of estimating, in a case that a weighting of the acoustic feature model satisfies a predetermined weighting criterion, an end point in the second user utterance using the acoustic feature model;
a step of calculating, in a case that a probability that a weighting of the lexical feature model calculated for a predetermined weighting criterion satisfies a predetermined probability criterion, a delay time from an end of the second user utterance to an output of the second machine utterance;
calculating an utterance rate of a user based on previous user utterances;
a step of selecting, based on the delay time and the utterance rate of the user, a sub-model from among a plurality of sub-models that is capable of reducing the delay time to within a predetermined time; and
a step of estimating an end point in the second user utterance using a selected sub-model.

* * * * *